United States Patent [19]

Suda

[11] Patent Number: 4,859,041

[45] Date of Patent: Aug. 22, 1989

[54] VARIABLE FOCUS OPTICAL DEVICE

[75] Inventor: Shigeyuki Suda, Yokohama, Japan

[73] Assignee: Canon Kabushiki Kaisha, Tokyo, Japan

[21] Appl. No.: 137,338

[22] Filed: Dec. 23, 1987

[30] Foreign Application Priority Data

Dec. 26, 1986 [JP] Japan ................................ 61-308727

[51] Int. Cl.$^4$ .......................... G02B 15/00; G02B 3/14
[52] U.S. Cl. ..................................... 350/423; 350/419
[58] Field of Search ........................ 350/418, 419, 423

[56] References Cited

U.S. PATENT DOCUMENTS 4,444,471  4/1984  Ford, Jr. et al. .................... 350/423

Primary Examiner—Bruce Y. Arnold
Assistant Examiner—Scott J. Sugarman
Attorney, Agent, or Firm—Fitzpatrick, Cella, Harper & Scinto

[57] ABSTRACT

A variable focus optical device comprises a plurality of elastic bodies laminated in the optical axis direction and a driving member having an opening provided on said elastic bodies and being capable of deforming the surfaces of said elastic bodies by applying a force onto said elastic bodies by said driving member to thereby permit the portion of said elastic bodies corresponding to the innerside of said opening to be protruded or recessed, the elastic body on the side of said driving member having a modulus greater than that of the elastic body adjacent thereto on the opposite side to said driving member, and the elastic body on said driving member side having a portion with the thickness being continuously decreased toward the optical axis.

9 Claims, 1 Drawing Sheet

VARIABLE FOCUS OPTICAL DEVICE

BACKGROUND OF THE INVENTION

1. Field of the Invention

This invention relates to a variable focus optical device having the focus distance made variable, particularly to a variable focus optical device in which the surface shape of the elastic body is varied by permitting the elastic body to be protruded or recessed at the innerside portion of the opening formed in the driving member.

2. Related Background Art

As a variable focus lens having the focus distance made variable, there has been known in the art the so called liquid lens, in which its shape is varied by liquid pressure as disclosed in Japanese Laid-open Patent Publication No. 36875/1980 or one utilizing a piezoelectric member as disclosed in Japanese Laid-open Patent Publication Nos. 110403/1981 and 85415/1983.

However, in the so called liquid lens of the former, liquid reservoir and pressuring device are required and therefore miniaturization of the device can be effected with difficulty, and also it has the disadvantage that plane deformation by gravitational force or vibration is great. Further, in the latter there was the drawback that the variable amount of the focus distance was small.

On the other hand, as a device which can solve these drawbacks, the present Applicant has proposed a variable focus optical device which can obtain a desired focus distance by deformation of an elastic body having light transmissivity, specifically by deforming the optical surface formed by the elastic body at the opening to any desired shape by permitting the elastic body having light transmissivity to be protruded or recessed from the opening (Japanese Laid-open Patent Publication Nos. 84502/1985 and 11120/1985.).

Further, the present Applicant, concerning Japanese Laid-open Patent Publication Nos. 84502/1985 and 11120/1985 as mentioned above, have proposed Japanese Laid-open Patent Publication No. 114802 in which the optical surface formed by the elastic body is used as the reflective surface; Japanese Laid-open Patent Publication No. 114804 in which the tackiness of the optical surface is ameliorated by increasing the elasticity of the optical surface; Japanese Laid-open Patent Publication No. 114805.1985 in which openings are provided as opposed up and down to each other; Japanese Laid-open Patent Publication No. 120301/1985 in which a desired optical surface is made by providing the optical surface with distributed elasticity; Japanese Laid-open Patent Publication No. 120303/1985 in which compaction is attempted by curing the elastic surface other than the optical surface; Japanese Laid-open Patent Publication No. 151603/1985 in which the position of the optical axis is also varied along with the focus distance by varing the direction of the opening; Japanese Laid-open Patent Publication No. 156003/1985 in which a desired optical surface is obtained by making the bottom plate opposed to the opening a convex shape or a concave shape; etc.

Whereas, in the variable focus optical device by use of elastic bodies with the constitutions presently known, during deformation of the elastic body, due to concentration of stress at the peripheral portion of the opening, deformation tends to become greater at the peripheral portion of the opening rather than at around the center of the opening, whereby a non-spherical shape with strong curvature may be formed at the peripheral portion of the opening, and also during deformation, for example, although it is desired to effect deformation while maintaining the spherical plane shape, the surface shape may be changed from spherical plane to nonspherical plane. Thus, it was still insufficient for obtaining desired optical characteristics.

The present Applicant, in order to prevent the elastic body from being shaped in the surface shape to nonspherical plane has previously proposed Japanese Laidopen Patent Publication No. 80863/1985 (U.S. Ser. No. 832,649, filed on Feb. 25, 1986 now U.S. Pat. No. 4,802,746). More specifically, within a vessel constituted of a bottom plate 2 formed of glass, etc. and a side wall 3 is housed a transparent elastic body 1, and the elastic body 1 is constituted of a first elastic body 1a and a second elastic body 1b laminated in the optical axis h direction. Above the elastic body 1 is provided an opened plate 4 freely movably on the side wall 3 as the driving member for deforming the elastic body 1. An opening 4a is formed in the opened plate 4, and the elastic body 1 within the opening 4a is protruded or recessed by the movement of the opened plate 4. FIG. 4 shows the state where no pressure is applied, and by application of a pressure onto the elastic body 1 through the opened plate 4, a part of the elastic body 1 will be protruded so as to become further greater in curvature of the convex lens than the opening 4a. On the contrary, if a negative pressure is applied onto the elastic body 1 adhered to the opened plate 4, the elastic body 1 will be recessed so as to become smaller in curvature at the opening 4a. This behaviour is the same, even when the surface shape under the initial state where no force is applied may be changed to flat or concave plane. The optical device shown in FIG. 4 is constituted such that, of the elastic body 1 comprising a plurality of elastic bodies, the modulus $E_A$ of the first elastic body 1a on the side of the driving member is made greater than the modulus $E_B$ of the second elastic body 1b adjacent to the first elastic body 1a, and the elastic body has a uniform thickness from the center to the peripheral portion.

Further, the present Applicant has proposed an optical device with the storage modulus and the loss modulus of the elastic body being both in the range of $5 \times 10^2$ to $1 \times 10^8$ dyne/cm$^2$ at a frequency in the range of 0.1 rad/s to $1 \times 10^3$ rad/s, and with the mechanical loss rate being 1 or less at a frequency in the range of 0.1 rad/s to $1 \times 10^3$ rad/s (Japanese Patent Application No. 119182/1986, U.S. Ser. No. 53,676, filed on May 26, 1987).

Since $E_A$ is greater than $E_B$ in the optical device having the above elastic body constituted of the first elastic body 1a and the second elastic body 1b, when the opened plate 4 is moved downward in FIG. 4, the elastic body 1b tends to be deformed greater. This deformation will make the interface between the elastic body 1b and the elastic body 1a a non-spherical plane shape with a strong curvature at the peripheral portion. As accompanied with such deformation, on the elastic body 1a will act the force to bend the elastic 1a by rising at the center portion of the elastic body 1b and the force to increase the area of the interface between the elastic body 1a and the elastic body 1b. When the elastic body 1a is thin, its primary rigidity is the elongation rigidity of the film. Accordingly, at this time, the elastic body 1a tends to make the surface area as small as possible and be deformed approximately in parabolic plane shape. On the other hand, when the elastic body is relatively thick, it will obstruct abrupt change in curvature by its flexural rigidity.

For this reason, the elastic body 1a in either case tends to be deformed in non-spherical plane shape with weak curvature at the peripheral portion as contrary to the elastic body 1b. Therefore, if the effect of making the elastic body 1a non-spherical plane with strong curvature at the peripheral portion is balanced with the effect of making it non-spherical plane with weak curvature at the peripheral portion, the surface of the elastic body 1a within the opening 4a will be deformed while maintaining a shape approximate to spherical plane.

Whereas, for the above optical device to be utilized widely for photographing optical systems such as camera, video, etc., it would be desirable to make thinner the device itself. However, in the optical device shown in FIG. 4, this can be done with difficulty. More specifically, in the optical device as described above, the elastic body with greater amount of deformation is required to have particularly good elastic characteristic and for that purpose it is desirable to reduce the change rate during deformation. Accordingly, the thickness of the elastic body 1b must be ensured to some extent. For this reason, when it is desired to make thinner the optical device, there is employed the constitution in which the thickness of the elastic body 1a is preponderantly made thinner. For obtaining a shape approximate to spherical plane for the surface of the elastic body 1a while making thinner the elastic body 1a, according to the analysis by use of the finite element method, it is required that the modulus ratio $E_A/E_B$ of the elastic body 1a and the elastic body 1b should be increased, even to 400 to 1000 in an extreme case.

On the other hand, as the material to be used for this optical device, silicone rubber may be preferably employed, and a plurality of elastic bodies with different moduli can be obtained by varying its crosslinking degree. And, the modulus obtained at this time may be about $3 \times 10^3$ to $2 \times 10^6$ dyne/cm$^2$, and a modulus ratio up to about 700 may be obtained as the material itself. However, when the elastic body is made to have a modulus of about $3 \times 10^3$ dyne/cm$^2$, its viscosity will become remarkably stronger to deteriorate response, and also due to the state approximate to liquid, molding and armoring thereof can be done with difficulty. Further, it is susceptible to the influence from gravitational force, whereby deformation by the weight of its own may also occur. Also, when the elastic body 1a is constituted to have a modulus of about $2 \times 10^6$ dyne/cm$^2$, toughness is deteriorated as undesirable with respect to durability.

For the reasons mentioned above, it is difficult to realize an optical device with thin film formation by a combination of a modulus ratio $E_A/E_B$ of 150 or higher.

SUMMARY OF THE INVENTION

An object of the present invention is to provide a variable focus optical device, which improves the problems as described above, can deform the surface shape of the elastic body as substantially the spherical surface without making so high a modulus ratio and yet can make thinner the whole elastic body.

The above object of the present invention can be accomplished by a variable focus optical device, comprising a plurality of elastic bodies laminated in the optical axis direction and a driving member having an opening provided on said elastic bodies and being capable of deforming the surfaces of said elastic bodies by applying a force onto said elastic bodies by said driving member to thereby permit the portion of said elastic bodies corresponding to the innerside of said opening to be protruded or recessed, the elastic body on the side of said driving member having a modulus greater than that of the elastic body adjacent thereto on the opposite side to said driving member, and the elastic body on said driving member side having a portion with the thickness being continuously decreased toward the optical axis.

DETAILED DESCRIPTION OF THE PREFERRED EMBODIMENTS

Figure 1:
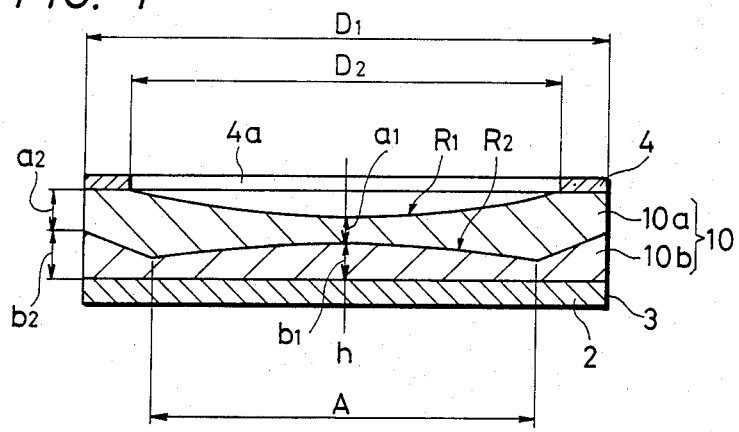
FIG. 1 is a sectional view showing an example of the variable focus optical device of the present invention of the embodiment with a flat concave lens shape.

FIG. 1 is a sectional view showing an embodiment of the variable focus optical device of the present invention, which is shaped in a flat concave lens. The elastic body 10 is constituted of two elastic body 10a and elastic body 10b which are laminated in the optical axis h direction. The elastic body 10a on the side of the driving member 4 has a shape so that the thickness is continuously decreased toward the optical axis h at the portion around the optical axis. Also, the modulus of the elastic body 10a is greater than that of the elastic body 10b adjacent thereto. By making the upper surface and/or the lower surface of the elastic body 10a a spherical surface, the thickness of the elastic body 10a may be decreased continuously, or alternatively the thickness of the elastic body 10a may be continuously decreased by making them non-spherical in shape.

The range in which the thickness of the elastic body 10a is continuously decreased toward the optical axis h may be only the range A in which the variable focus optical device of the present invention can be effectively used (shown by A in FIG. 1; hereinafter called the effective range), and the thickness is not required to become continuously thinner in the whole elastic body 10a.

When no such thickness structure as in the present invention is employed, namely in the case of a variable focus optical device when the thickness of the elastic body 1a on the side of the driving member is constituted of uniform thickness from the center to the peripheral portion, by making smaller the modulus ratio $E_A/E_B$ of the modulus $E_A$ of the elastic body 10a to the modulus $E_B$ of the elastic body 10b, the elastic body becomes a non-spherical shape with a strong curvature at the peripheral portion, whereby the curvature change at the center will become little. If the peripheral portion of the elastic body 10a is made thicker from this state as in the present invention, the flexural rigidity at this portion will be increased, whereby the degree of curvature change at the peripheral portion can be reduced. On the contrary, by making the central portion of the elastic body thinner, the elongation rigidity at this portion will be reduced, whereby it becomes possible to promote curvature change at the center portion. Accordingly, in the elastic body 10a to be used in the present invention, by being formed into a concave lens shape which can give the synergetic effect of both of them, the surface of the elastic body 10 during deformation can be approximated to a spherical shape.

On the other hand, the elastic body 10b located on the opposite side to the driving member is increased continuously in thickness toward the optical axis h, corresponding to the continuous decrease in thickness of the elastic body 10a toward the optical axis h.

Figure 4:
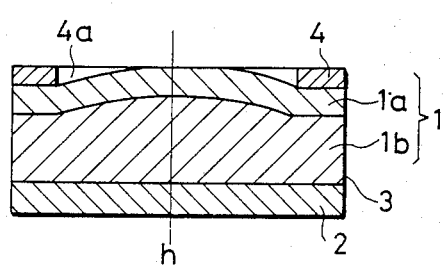
FIG. 4 is a sectional view of the variable focus optical device previously proposed by the present Applicant.

Outside of the effective range A, the sectional shapes of the elastic body 10a and the elastic body 10b may be any desired ones, but when the thickness of the elastic body 10b is too thin outside the effective range A, increase of the change ratio during deformation may sometimes become a defect. In this case, as shown in FIG. 1, the thickness of the elastic body 10b should be preferably made thicker toward outside of the effective range A. Thus, since the sectional shape of the elastic body 10 outside the effective range A has little influence on the surface shape within the opening, there remains a degree of freedom to devise the boundary shape between the elastic bodies 10a and 10b. Accordingly, for example, the shape of the elastic body 10a can be made to take a shape in which the thickness is made maximum in the vicinity of the maximum diameter of the effective range A and made thinner linearly toward the peripheral portion. By doing so, the thickness of the elastic body 10b can be increased to reduce the change ratio during deformation. Other constitutions are the same as in the optical device shown in FIG. 4.

The modulus ratio $E_A/E_B$ of the modulus $E_A$ of the elastic body 10a to the modulus $E_B$ of the elastic body 10b may be preferably 50 to 500.

Thus, by making the elastic bodies 10a, 10b and the bottom plate 2 transparent, the focus distance is varied by moving the driving member 4. Also, the elastic body surface within the opening 4a can be also formed by vapor deposition, etc. and utilized as the reflective surface.

Figure 2:
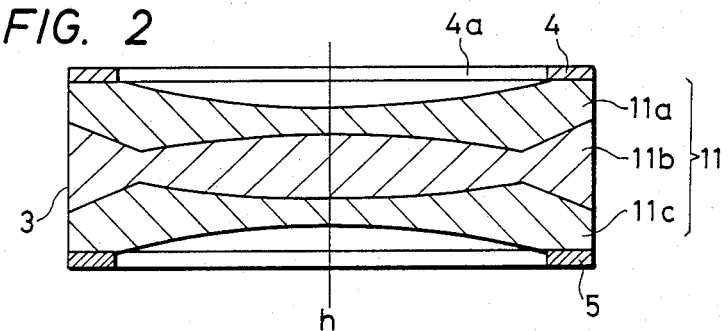
FIG. 2 is a sectional view showing another example of the variable focus optical device of the present invention.

FIG. 2 is an example of the case when opened plates are provided on both surfaces (shown by 4 and 5 in FIG. 2) and the surfaces of the two elastic bodies 11a, 11c are both variable in shape, in which 11a, 11b and 11c are each transparent elastic body, and the elastic body 11b adjacent to the elastic bodies 11a, 11c on the side of the driving members has the smallest modulus. The modulus of the elastic body 11a may be either the same as or different from that of the elastic body 11c.

The elastic bodies 11a and 11c have the structure around the optical axis in which the thickness is continuously decreased toward the optical axis h similarly as in the example shown in FIG. 1. The elastic body 11b is continuously increased in thickness toward the optical axid h, corresponding to the continuous decrease in thickness toward the optical axis h of the elastic bodies 11a, 11c.

4, 5 are opened plates which are driving members and openings 4a, 5b are formed respectively therein. In the example shown in the Figure, the opened plate 4 is fixed on the side wall 3, and the opened plate 5 can be moved along the inner surface of the side wall in the optical axis h direction to vary simultaneously the two surface shapes. The opened plates 4 and 5 may be also provided so as to be both movable.

Figure 3:
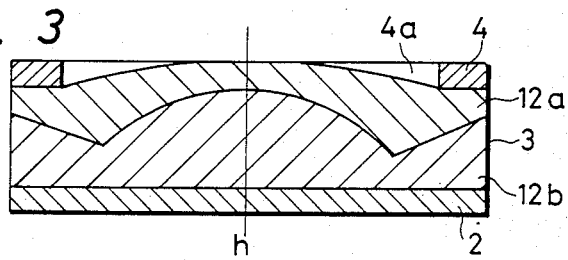
FIG. 3 is a sectional view showing an example of the variable focus optical device of the present invention with a flat convex shape.

FIG. 3 shows the variable focus optical device with a flat convex lens shape in which the surface of the elastic body 12a on the side of the driving member 4 is protruded from the opening 4a of the driving member at the initial state where no force is applied. Also in this case, the elastic body 12a has a portion which is continuously decreased in thickness toward the optical axis h. The shape of the elastic body 12b is formed in a shape corresponding to the shape of the elastic body 12a. Other constitutions are the same as in the variable focus optical element shown in FIG. 1.

As such elastic body, when the optical device obtained by the present invention is to be used as a lens, a material having high transparency (at least to the light with the wavelength employed) may be preferably used.

In the present invention, for example, elastic materials as enumerated below may be employed.

(a) Diene type rubber:

For example, diene polymers of butadiene, isoprene, etc., diene-vinyl type copolymers of nitrile rubber, acrylic rubber, etc.

(b) Ethylene type copolymer:

For example, copolymers of one kind or several kinds of compounds selected from α-olefins, dienes, polar group mono-substituted vinyl compounds (acrylic acids, methacrylic acids, styrene, vinyl chloride, vinyl ether, etc.), di-substituted vinyl compounds (maleic acids), etc. with ethylene (these ethylenic copolymers have reduced markedly or vanished crystallinity of ethylene).

(c) Olefinic rubbers:

For example, polyisobutene, atactic polypropylene, polyvinyl chloride (mixed with relative larger amount of plasticizers), copolymers of two or more kinds of acrylic acid or acrylic acid esters, copolymers comprising two or more kinds of acrylic acid derivative monomers (containing water or high boiling point solvent).

(d) Other rubbers:

For example, silicone polymer (dimethylsilicone polymer, diphenyldimethyl silicone polymer, etc.), phosphazene polymer.

The elastic body materials as enumerated above may be crosslinked, if necessary, and, for example, by controlling the extent of crosslinking, the moduli $E_A$, $E_B$ as mentioned above can be varied. Such crosslinking may be effected by use of a crosslinking agent comprising sulfur, peroxides, etc.

As the material constituting the elastic body in the present invention, various elastomers as mentioned above may be employed, but silicone rubber, ethylene-propylene-diene terpolymer, etc. may be particularly preferably used from the point that an elastic body having preferable mechanical characteristics (modulus, etc.) or preferable optical characteristics (transparency, refractive index, etc.) can be formed easily.

Also, there may be employed the material proposed by the present Applicant in Japanese Patent Application No. 83762/1986, namely a polysiloxane resin substituted at least on the surface with a fluorinated hydrocarbon group, and the material proposed similarly by the present Applicant, namely the material containing a gel obtained by combination of a monohydroxy aluminum organocarboxylate having the formula (I) shown below with at least one compound selected from the group consisting of hydrocarbon compounds which are liquid at least at room temperature and derivatives thereof.

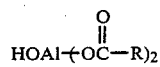
(I)

(wherein R represents an aliphatic hydrocarbon group having 3 or more carbon atoms).

Also, in preparing the variable focus optical device of the present invention, the surface of the elastic body is required to be formed with good precision. For example, the elastic body 10a is first molded in a mold and, on curing of the elastic body 10a, the mold at the portion corresponding to the elastic body 10b is removed, and here is injected the material for the elastic body 10b, followed by curing. Then, these laminated elastic bodies are mounted on the bottom plate 2, the side wall 3 and the opened plate 4 to obtain the variable focus optical device of the present invention. The elastic body can be molded by various methods such as casting, injection, etc.

In the following, how the surface shape within the opening 4a of the elastic body 10a was deformed when the distance between the opened plate 4 and the bottom plate 2 was varied by use of the optical device of the present invention shown in FIG. 1 was analyzed according to the finite element method.

Table 1 shows the dimensions of the optical element, and various parameters of material properties, etc.

TABLE 1

| | | |
|---|---|---|
| Thickness of elastic body 10a on optical axis h | $a_1$ | 1.1 mm |
| Thickness of elastic body 10b on optical axis h | $b_1$ | 1.4 mm |
| Radius of curvature | $R_1$ | −38.08 mm (concave plane) |
| Radius of curvature | $R_2$ | 51.984 mm (opposite direction to $R_1$) |
| Diameter of opening | $D_2$ | 18 mm φ |
| Outer diameter of opened plate | $D_1$ | 22 mm φ |
| Outer diameter of effective range (diameter at the interface between elastic body 10a and elastic body 10b) | | 16 mm φ |
| Outer peripheral thickness of elastic body 10a | $a_2$ | 1.70 mm |
| Outer peripheral thickness of elastic body 10b | $b_2$ | 1.88 mm |
| Young's modulus ratio ($E_A/E_B$) | | 130 |
| Poison ratio of elastic body 10a | | 0.49 |
| Poison ratio of elastic body 10b | | 0.49 |

The variable focus optical device of the present invention shown in Table 1 has a relatively smaller modulus ratio $E_A/E_B$ of 130 of the elastic body 10a and the elastic body 10b, and a thin thickness of 2.5 mm of the elastic body relative to 18 mm μ of the opening diameter $D_2$, thus realizing thin film formation.

Thus, when the opened plate 4 is pushed 338 φ the surface shape of the elastic body 10 within the opening 4a becomes a concave plane with a radius of curvature of 74.051 mm. At this time, the RMS value of the planar shape deviation between the plane shape and the spherical plane shape is about 1.3 μm to give a plane shape approximate to spherical plane.

On the contrary, when the opened plate 4 is withdrawn 286 μm from the original position, the surface shape of the elastic body 10a within the opening 4a becomes a concave plane with a radius of curvature of 27.231 mm. At this time, the RMS value of the plane shape deviation between the plane shape and the spherical plane is similarly about 1.3 μm to give also a plane shape approximate to spherical plane. Further, in the variable focus optical device shown in Table 1, the maximum change ratio of the elastic body 10b can be made as small as about 20%, whereby good elastic characteristic region of silicone rubber can be used.

In the variable focus optical device of the present invention, description has been made by referring to an optical device with a rotational symmetrical three-dimensional structure as an example, but it can be also made a cylindrical lens or a toric lens.

The variable focus optical device of the present invention can be widely utilized for, for example, the optical systems shown in Japanese Patent Application Nos. 15273/1986 and 16512/1986 proposed by the present Applicant.

As described above, according to the variable focus optical device of the present invention, the surface shape of the elastic body can be deformed as substantially the spherical plane without making so high the modulus ratio of the elastic bodies laminated, and also the surface shape of the elastic body can be deformed as substantially the spherical plane even when the whole optical device may be formed into a thin film.

What is claimed is:

1. A variable focus optical device having an optical axis, comprising at least first and second elastic bodies laminated in the optical axis direction, and a driving member having an opening, with an inner side of said driving member being in contact with one of said elastic bodies and being capable of deforming surfaces of said elastic bodies by applying a force thereto, said first elastic body being disposed adjacent to said driving member and having a modulus greater than that of said second elastic body disposed adjacent to said first elastic body and opposite from said driving member, and said first elastic body having a first portion with a thickness that continuously decreases toward the optical axis.

2. A variable focus optical device according to claim 1, wherein said second elastic body has a portion with the thickness continuously increasing toward the optical axis.

3. A variable focus optical device according to claim 1, wherein said first elastic body has a second portion, disposed outside of said first portion, where the thickness increases toward the optical axis.

4. A variable focus optical device according to claim 1, wherein the ratio of the modulus $E_A$ of said first elastic body to the modulus $E_B$ of said second elastic body is 50 to 500.

5. A variable focus optical device according to claim 1, further comprising a third elastic body, with said first and third elastic bodies having a thickness which continuously decreases toward the optical axis, and said second elastic body being sandwiched between said first and third elastic bodies and having a smaller modulus than said first and third elastic bodies.

6. A variable focus optical device according to claim 5, wherein said first and third elastic bodies have moduli equal to each other.

7. A variable focus optical device according to claim 5 wherein said first and third elastic bodies have moduli different from each other.

8. A variable focus optical device according to claim 1, wherein said elastic bodies corresponding to said innerside of said driving member are recessed therefrom in an initial state where no force is applied onto said elastic bodies.

9. A variable focus optical device according to claim 1, wherein said elastic bodies corresponding to said innerside of said driving protrude therefrom in under an initial state where no force is applied onto said elastic bodies.

* * * * *

UNITED STATES PATENT AND TRADEMARK OFFICE
CERTIFICATE OF CORRECTION

PATENT NO. : 4,859,041
DATED : August 22, 1989
INVENTOR(S) : SHIGEYUKI SUDA

It is certified that error appears in the above-identified patent and that said Letters Patent is hereby corrected as shown below:

Column 1
   Line 47, "No. 114805.1985" should read --No. 114805/1985--.
   Line 57, "varing" should read --varying--.

Column 2
   Line 19, "movably" should read --movable--.

Column 3
   Line 44, close up right margin.
   Line 45, close up left margin.

Column 5
   Line 60, "axid h" should read --axis h--.

Column 8
   Line 22, "deformed as" should read --deformed to--.
   Line 24 "elastic bodies laminated" should read --laminated elastic bodies--.
   Line 25, "deformed as" should read --deformed to--.
   Line 67, "5" should read --5,--.

UNITED STATES PATENT AND TRADEMARK OFFICE
CERTIFICATE OF CORRECTION

PATENT NO. : 4,859,041

DATED : August 22, 1989

INVENTOR(S) : SHIGEYUKI SUDA

It is certified that error appears in the above-identified patent and that said Letters Patent is hereby corrected as shown below:

Column 10

Line 2, "driving" should read --driving member-- and "under" should be deleted.

Signed and Sealed this

First Day of September, 1992

Attest:

DOUGLAS B. COMER

*Attesting Officer*   Acting Commissioner of Patents and Trademarks